(12) United States Patent
Li et al.

(10) Patent No.: US 8,746,619 B2
(45) Date of Patent: Jun. 10, 2014

(54) TAIL CAPABLE OF IMPROVING ANTI-BIRD STRIKE PERFORMANCE OF AIRCRAFT

(71) Applicant: Northwestern Polytechnical University, Xi'an (CN)

(72) Inventors: Yulong Li, Xi'an (CN); Jun Liu, Xi'an (CN); Tao Suo, Xi'an (CN); Zhongbin Tang, Xi'an (CN); Jun Lv, Zhangjiang (CN); Liangdao Zhou, Zhangjiang (CN); Guangrong Zhu, Zhangjiang (CN); Hao Cong, Zhangjiang (CN); Zhengli Zhang, Zhangjiang (CN)

(73) Assignee: Northwestern Polytechnical University, Xi'an, Shan Xi (CN)

( * ) Notice: Subject to any disclaimer, the term of this patent is extended or adjusted under 35 U.S.C. 154(b) by 0 days.

(21) Appl. No.: 13/630,654

(22) Filed: Sep. 28, 2012

(65) Prior Publication Data

US 2013/0082142 A1 Apr. 4, 2013

(30) Foreign Application Priority Data

Sep. 29, 2011 (CN) .......................... 2011 1 0291295

(51) Int. Cl.
*B64C 1/00* (2006.01)
*B64D 7/00* (2006.01)

(52) U.S. Cl.
USPC ...................................... 244/121; 244/123.1

(58) Field of Classification Search
USPC ......... 244/123.1, 121, 131, 132, 123.7, 123.8
See application file for complete search history.

(56) References Cited

U.S. PATENT DOCUMENTS

| | | | | | |
|---|---|---|---|---|---|
| 2,233,969 | A | * | 3/1941 | Woods | 244/123.8 |
| 3,200,477 | A | * | 8/1965 | Shultz | 29/889.72 |
| 6,638,466 | B1 | * | 10/2003 | Abbott | 264/238 |
| 7,866,605 | B2 | * | 1/2011 | Lee et al. | 244/121 |
| 8,066,222 | B2 | * | 11/2011 | Lee et al. | 244/121 |
| 8,123,167 | B2 | * | 2/2012 | Olmi et al. | 244/121 |
| 2007/0272799 | A1 | * | 11/2007 | Verdan | 244/123.6 |
| 2008/0265095 | A1 | * | 10/2008 | Lee et al. | 244/129.1 |
| 2009/0127392 | A1 | * | 5/2009 | Gross et al. | 244/121 |
| 2010/0148006 | A1 | * | 6/2010 | Olmi et al. | 244/121 |
| 2011/0095131 | A1 | * | 4/2011 | Lee et al. | 244/121 |

* cited by examiner

*Primary Examiner* — Philip J Bonzell
(74) *Attorney, Agent, or Firm* — Myers Bigel Sibley & Sajovec, PA

(57) ABSTRACT

The present invention relates to a tail for improving anti-bird strike performance of an aircraft. A leading edge reinforcement having a shape of an isosceles triangle is located inside a tail leading edge. The leading edge reinforcement is spanwisely fixed in sections between respective spans formed by the wing rib inside the tail leading edge along the tail of the aircraft. An apex angle of the leading edge reinforcement is the same as an apex angle or arc transition of the tail leading edge skin. The leading edge reinforcement is fixedly connected with the small front beam by a leading edge reinforcement fixed surface. The present invention additionally installs a leading edge reinforcement in the original tail of the aircraft.

5 Claims, 6 Drawing Sheets

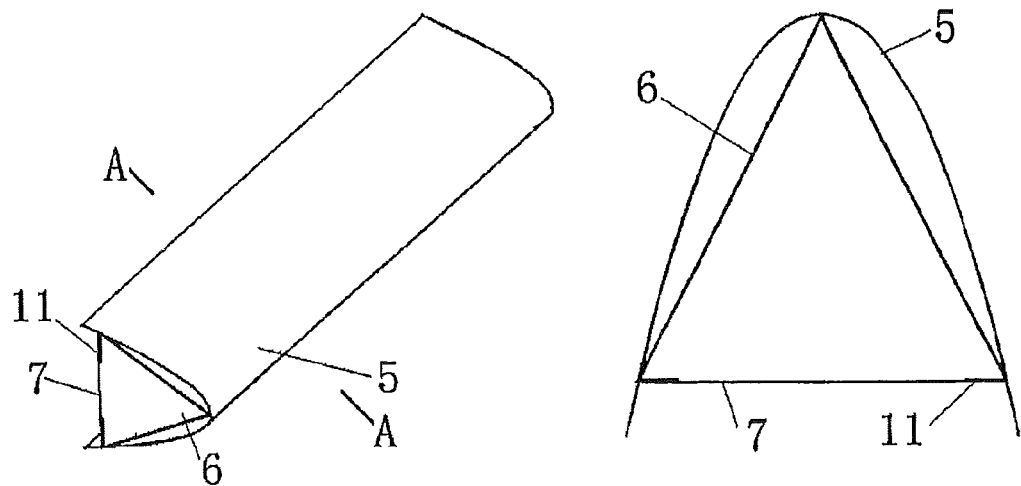
Fig. 3
A-A
Fig. 4
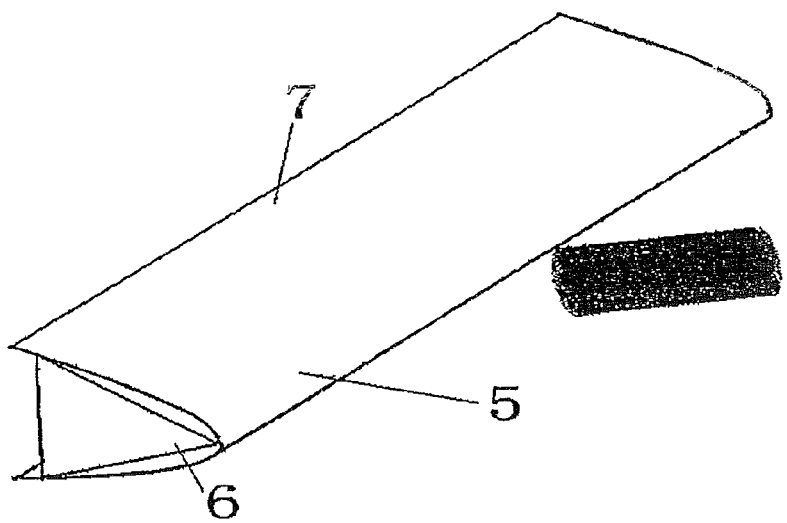
Fig 5

TAIL CAPABLE OF IMPROVING ANTI-BIRD STRIKE PERFORMANCE OF AIRCRAFT

REFERENCE TO PRIORITY APPLICATION

This application claims the benefit of Chinese Application No. 201110291295.9, filed on Sep. 29, 2011, the disclosure of which is hereby incorporated by reference herein in its entirety.

TECHNICAL FIELD

The present invention relates to the field of aircraft structure, and more particularly to an aircraft tail capable of improving anti-bird strike performance of aircraft.

BACKGROUND ART

A bird-strike accident refers to an occurrence that arises due to the collision of a flying aerocraft such as aircraft with a flying bird in the sky. With a rapid development of the civil aviation industry, the bird-strike accident of the civil aircraft becomes one of the most severe safety and security threats of the civil aviation. As shown in the related report of the UA (United Airlines), during the period of 1990 to 2008, U.S. civil aviation reported 89,727 accidents caused by the collision of animals with the civil aircrafts, and 97.4% of these accidents are caused by flying birds. Related data show that the windward side of the aircraft, including the windshield, the radome, the engine, the wing leading edge and the tail leading edge of the aircraft, is the position which is most easily struck by birds. The interior of the leading edge structure is usually provided with oil circuit system or control wiring system, and disastrous accidents can hardly be avoided once those internal facilities are destroyed by the bird strike. Thus, it counts for much to resolve the problem of anti-bird strike performance of the tail leading edge of aircraft. It is explicitly prescribed in Paragraph 631 in Article 25 of the *Airworthiness Standard of Transport Aircraft* issued by the CAAC that the design of structure for an aircraft tail must ensure that the aircraft, after encounter of collision with a bird of 3.6 kilograms (8 pounds), can still fly and land safely, and the speed of the aircraft during the collision is equal to the cruising speed of the aircraft at a selected sea level. Some research indicates that the bird represents predictable hydromechanical behavior under a high speed strike.

At present, most of the designs of the anti-bird strike with respect to the tail leading edge adopt a high-strength composite material and a simple sandwich structure. Most of the design ideas present the function and shape with sacrificial structure so as to be deformed as far as possible to absorb the energy of the bird strike. In addition, taking a vertical tail leading edge structure mentioned by Alessandro Airoldi, et al. in related documents as an example, the outer surface of this structure is made from an aluminum alloy material, and the interior of this structure is made from a carbon fiber composite material. In the experiment, a bird of 4 pounds is used to strike the structure at a speed of 270 knots, and the structure is obviously destroyed. M. A. McCARTHY, et al. issue a wing leading edge structure having the leading edge skin being the FML composite material. In the experiment, the structure bears the strike of a bird of 4 pounds at a speed of 200 m/s, and the leading edge is not broken down but deformed tremendously. Recently, Michele Guida, et al. further put forward a sandwich leading edge structure, the two layers of panels of the sandwich structure adopting the FML composite material and the metallic material respectively, and the core layer being a honeycomb. In the process of the experiment, a bird of 8 pounds is used to strike the structure at a speed of 250 knots, and the leading edge is not broken down, but the entire structure is deformed tremendously. It can be seen that the manufacture expenses of existing structure designs are extremely high however the entire structure is either broken down or deformed tremendously and the effect of anti-bird strike is not satisfactory.

In order to overcome the defects of large deformation and damage and high cost in the prior art of the anti-bird strike of the aircraft structure, the Northwestern Polytechnical University puts forward a horizontal tail leading edge capable of enhancing anti-bird strike performance of aircraft in the Chinese patent application for invention with the application No. 201010554079.4. As shown in FIGS. 1 and 2, the horizontal tail leading edge comprises a leading edge skin 1, a honeycomb core layer 2, a reinforcement 3 located at the horizontal tail leading edge and a wing underlayer 4. The honeycomb core layer 2, the leading edge reinforcement 3 and the wing underlayer 4 are all spanwisely arranged between respective spans inside the wing leading edge. The leading edge reinforcement 3 takes on a shape of triangular prism, and one angle of this leading edge reinforcement is located at the front end of the wing leading edge. The upper honeycomb core layer and the lower honeycomb core layer each take on a shape of a parallelogram and are fixed to the upper and lower inner surfaces of the leading edge skin respectively. One beveled edge of the upper honeycomb core and one beveled edge of the lower honeycomb core both match with one lateral surface of the leading edge reinforcement. The wing liner is fixed to the two honeycomb cores and the surface of the leading edge reinforcement. After the above horizontal tail leading edge structure is struck by a bird, although the segmentation of the bird serves the purpose of protecting the wing liner, this structure has the following defects: the lower honeycomb core is made of a soft material, and suffers a very large compressive deformation under the action of the powerful impact force of the bird, so that the support stiffness of the leading edge skin becomes small, which results in invalidation of the leading edge skin. As can be seen, the skin becomes invalid mainly for the reason that the support stiffness of the skin is reduced, and the invalidation of the leading edge skin will severely influence the aerodynamic performance of the horizontal tail in the flying process. Thus, by a comprehensive consideration of the designs of the anti-bird strike performance and the aerodynamic performance, the applicability of this horizontal tail leading edge capable of enhancing the anti-bird strike performance of the aircraft is not strong.

SUMMARY OF THE INVENTION

In order to overcome the defect that it is difficult to give consideration to both of the anti-bird strike performance and the aerodynamic shape in the design of the tail structure of aircraft, embodiments of the present invention are directed to aircraft tails and related structures for improving anti-bird strike performance of aircraft.

According to some embodiments, an airplane tail includes: a tail leading edge skin, a small front beam, a wing rib, a big front beam, a leading edge cabin skin and a leading edge reinforcement. The leading edge reinforcement is located inside a tail leading edge, and is spanwisely distributed between 0-100% of the wing span and chordwisely distributed between 0-30% of the tail. The leading edge reinforcement is spanwisely fixed in sections between respective spans configured by the wing rib inside the tail leading edge along the tail of the aircraft.

The leading edge reinforcement has a shape of an isosceles triangle. The degrees of an apex angle of the leading edge reinforcement are the same as the degrees of an apex angle of the tail leading edge skin, with the apex angle of the tail leading edge skin being a transition arc; the radius of the arc being 5 mm. The leading edge reinforcement is fixedly connected with the small front beam through a leading edge reinforcement fixed surface.

The two side edges of the leading edge reinforcement are both provided with folded edges, which are located on the same surface of the leading edge reinforcement and are both folded toward the inner side of the leading edge reinforcement to thereby form the leading edge reinforcement fixed surface.

According to some embodiments, the present invention additionally installs a leading edge reinforcement in the tail of the aircraft to thereby achieve the object of enhancing the anti-bird strike performance of the aircraft, and the leading edge reinforcement takes on a "V" shape. The structure cuts the bird by a triangle support of the structure itself, after the tail is struck by a bird, and the leading edge skin sticks to the triangle support structure to segment energy of the bird to not only protect the tail front beam from being broken down so as to further protect the internal structure of the tail leading edge from being destroyed, but also keep the aerodynamic shape of the tail well.

The tail leading edge structure includes a leading edge skin, a small front beam and a leading edge reinforcement. The above structure member is made from an aluminum alloy material. Wherein the leading edge reinforcement of the tail leading edge is in a shape of an isosceles triangle formed by bending of a flat plate, the apex of the triangle is an arc of a radius of 5 mm, and the left and right ends of the leading edge reinforcement are bolt connected or rivet connected with the small front beam. Except the leading edge skin, all the members of the structure are inside the tail and spanwisely settled along the inside of the entire tail leading edge.

The present invention gives a sufficient consideration to the characteristics of the problem of the bird strike, e.g., the bird represents a hydrodynamic behavior and has very high energy in the striking process. The structure must be deformed tremendously or damaged if "inflexibly blocking" the energy. Thus, dispersion is a favorable method, by which the energy from the bird can be diffuse, and the present invention segments the bird by the leading edge reinforcement disposed inside the tail, changes the front strike to the oblique strike, and reasonably disperses the energy of the bird strike. The comparatively thin leading edge skin absorbs part of the energy after the segmentation of the bird by the deformation and invalidation, and the leading edge reinforcement helps to guarantee the safety of the internal structure of the vertical tail leading edge. Besides, since the deformation of the comparatively thin leading edge skin is comparatively small, the collapse of the skin is prevented, and the aerodynamic shape of the tail is maintained.

The present invention changes the original absorption of energy to the dispersion of energy, segments the bird by the leading edge reinforcement disposed inside the leading edge, changes the front strike to the oblique strike, reasonably disperses the energy of the bird strike, and effectively improves the anti-bird strike performance of the structure.

Since the bird is segmented, the residual segmented bird slides away along the left and right sides of the tail skin layer, and the leading edge reinforcement disposed inside the leading edge prevents the collapse of the skin, makes the leading edge structure less immune to a tremendous deformation appearing in the previous designs, keeps the aerodynamic shape of the tail leading edge as far as possible, and is applied to the wing leading edge and any beam-edge structure which may be struck by flying birds on the aircraft.

FIG. 5 is a schematic diagram of the bird strike value stimulation. In the figure, the bird is expressed as a cylinder having a length to diameter ratio of 2, and its value calculating method is expressed using SPH particles. The mass of the bird is 3.6 kg, and the speed of the strike is 150 m/s.

FIG. 6 is the segmenting process of the bird by the leading edge. FIG. 6(a) is the state of the bird before the start of the strike. FIG. 6(b) is the state of the bird after the start of the strike for 1.5 ms. It can be seen that in the striking process, the bird is obviously cut by the leading edge structure. FIG. 6(c) is the state of the bird after the start of the strike for 3 ms. It can be seen that the two parts formed by the cutting of the bird by the leading edge structure slide out along the upper and lower surfaces of the tail leading edge skin 5 (FIG. 5).

FIG. 7 is a schematic diagram of the impact on the structure after the segmentation of the bird. It can be seen that the tail leading edge skin suffers a comparatively small deformation after absorbing part of the energy of the bird and serves the purpose of protecting the internal structure of the tail.

In the present invention, the leading edge reinforcement added to the tail is installed inside the tail leading edge and will not influence the aerodynamic performance of the aircraft, and is simple in manufacture, low in cost, and applicable to the tail and wing leading edges and any beam-edge position which may be struck by flying birds on the aircraft.

The present invention gives a sufficient consideration to the defect that the leading edge skin is torn and destroyed in the bird striking process due to the insufficient strength of the honeycomb core layer supporting the skin existing in the invention with Chinese Patent Application No. 201010554079.4 in theory, and the present invention adopts a metallic triangle structure with a comparatively good stiffness as the reinforcement. The adopted technical solution not only makes the tail leading edge serve the purpose of cutting the bird but also makes the stiffness of the reinforcement below the tail skin good enough. Otherwise, the cases of the collapse and invalidation of the skin will occur.

In the technical solution adopted by the present invention, both the requirement for the stiffness of the reinforcement and the requirement for the mass by the design of the aircraft should be considered. The present invention, when determining the structure and anti-impact performance of the leading edge reinforcement, gives a sufficient consideration to the relationship between the structure and the stiffness of the leading edge reinforcement, and minimizes the structure weight of the leading edge reinforcement while maintaining the desired stiffness.

FIG. 8 gives the value stimulation result of leading edge reinforcements of different thicknesses. As can be seen, the smaller the thickness of the leading edge reinforcement, the lighter the weight of the leading edge reinforcement, and the smaller the anti-bird strike performance of the leading edge reinforcement. The insufficient original thickness results in the insufficient stiffness of the reinforcement structure and the disability of supporting the deformation of the skin under the strong impact pressure of the bird, which results in the collapse of the skin and makes the tail structure unable to meet the aerodynamic requirement.

The present invention gives a sufficient consideration to the relationship between the anti-strike ability of the wing and the weight of the wing after the tail leading edge is reinforced, and the applicant makes a large amount of study work. For example, when the thickness of the leading edge reinforcement is 3 mm, the stiffness is very good, and the entire tail leading edge suffers a very small deformation after the strike of the bird, but the weight of the leading edge reinforcement at this time reaches 8.1 kg, which brings a disadvantage to the weight reduction of the entire aircraft. When the thickness of the leading edge reinforcement is selected as 2.5 mm, after conducting a number of calculations and experiments, the weight of the tail is reduced, and the entire tail leading edge suffers a very small deformation after the strike of the bird, which not only meets the requirement for the anti-bird strike design but also meets the aerodynamic requirement of the tail.

BRIEF DESCRIPTION OF THE DRAWINGS

FIG. 3 is a schematic diagram of a leading edge structure according to some embodiments;

FIG. 4 is a schematic diagram of the direction A-A in FIG. 3;

FIG. 5 is a schematic diagram of the anti-bird strike value stimulation of the tail;

FIG. 6 is a schematic diagram of the segmenting process of the bird by the tail leading edge, in which FIG. 6a is the state of the bird before the start of the strike, FIG. 6b is the state of the bird after 1.5 ms from the start of the strike, and FIG. 6c is the state of the bird after 3 ms from the start of the strike;

Figure 1:
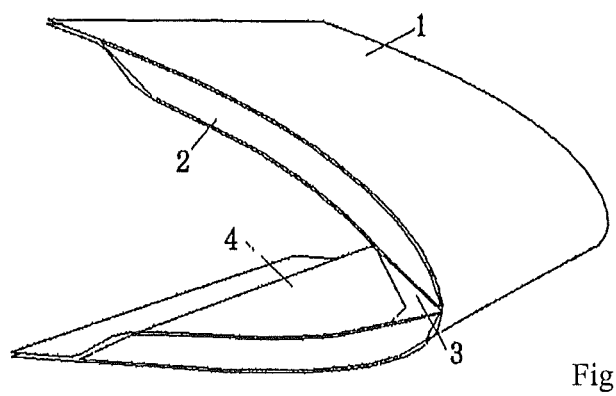
FIG. 1 is a schematic diagram of the structure of the anti-bird strike horizontal tail leading edge of the aircraft in the prior art.
Figure 2:
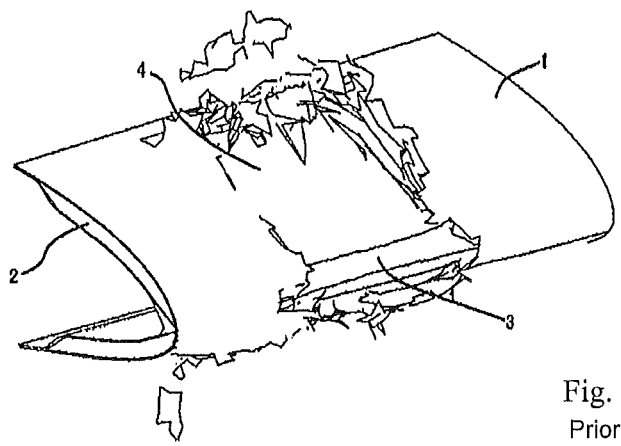
FIG. 2 is a deformation damage diagram of the anti-bird strike value stimulation result of the present invention.
Figure 6:
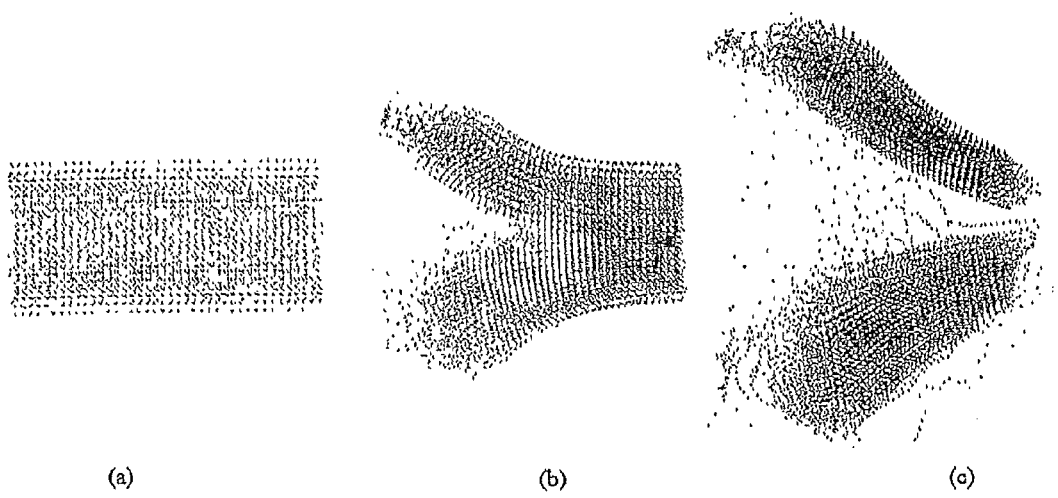
Figure 7:
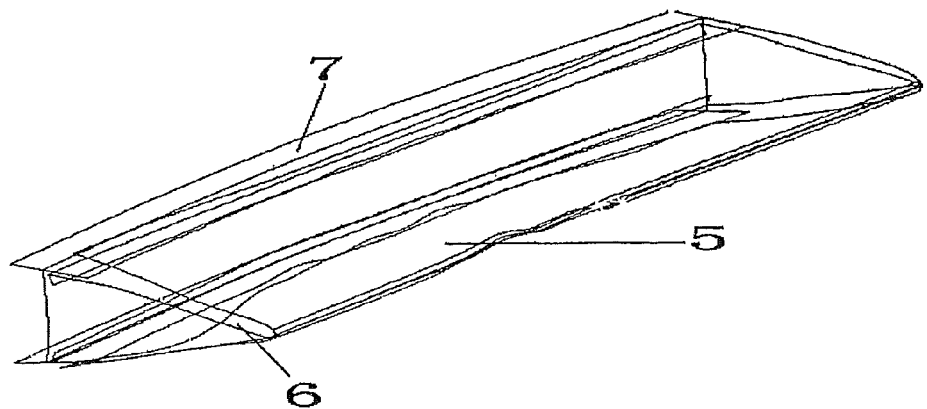
FIG. 7 is a schematic diagram of the deformation of the leading edge skin after the strike.
Figure 8:
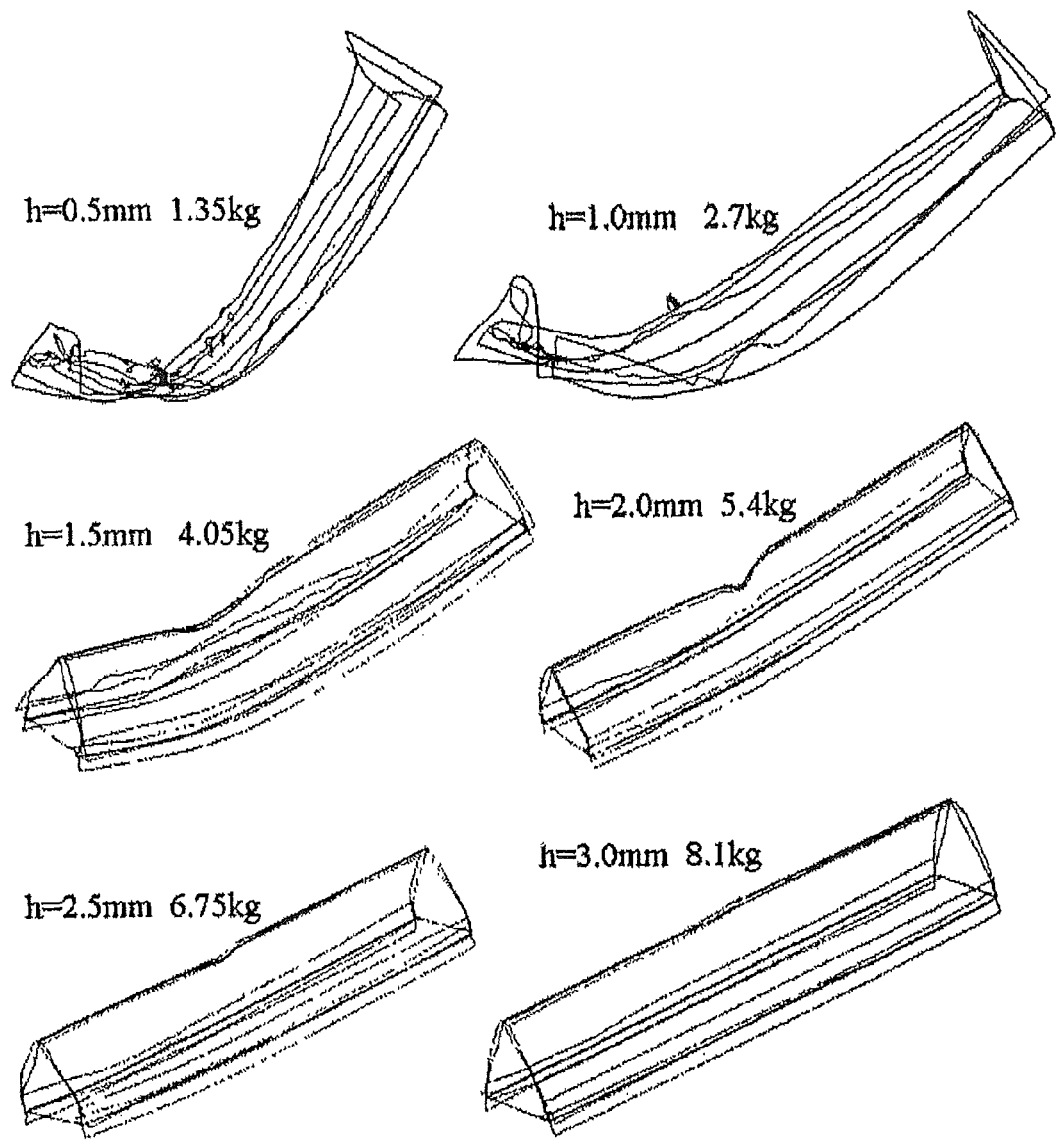
FIG. 8 is a comparison of the bird strike value stimulation results of tails having leading edge reinforcements of different thicknesses.

In the Figures: 1. leading edge skin 2. honeycomb core 3. reinforcement 4. wing liner 5. tail leading edge skin
6. leading edge reinforcement 7. small front beam 8. wing rib 9. big front beam 10. leading edge cabin skin
11. leading edge reinforcement fixed surface

DETAILED DESCRIPTION

Figure 9:
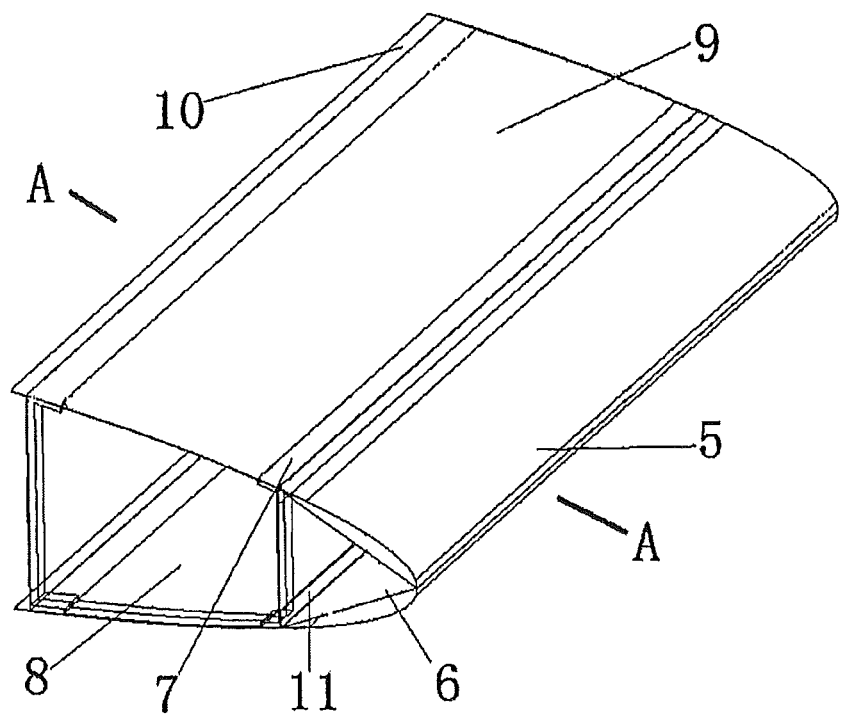
FIG. 9 is a schematic diagram of the structure of a span of the tail according to some embodiments.
Figure 10:
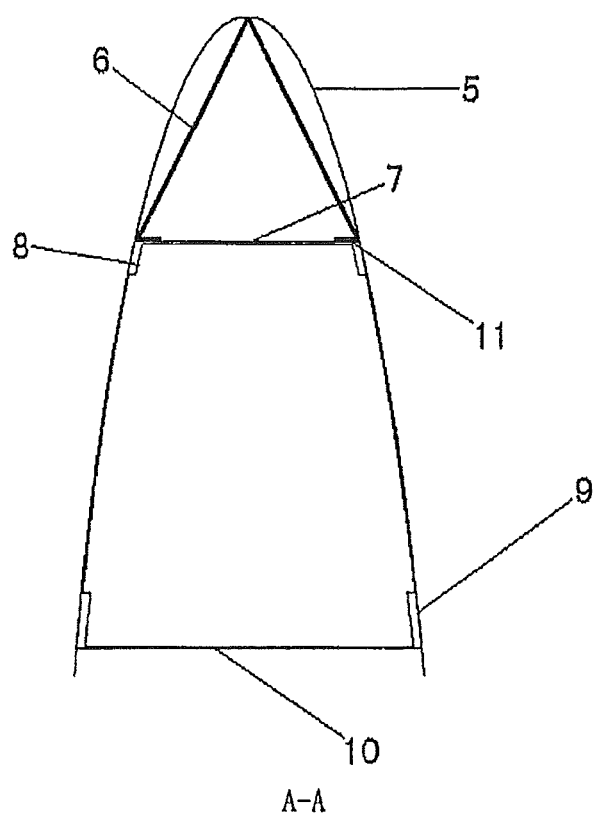
FIG. 10 is a schematic diagram of the direction A-A in FIG. 9.

The embodiment illustrated in FIGS. 9 and 10 is an anti-bird strike tail of aircraft of a certain type.

As shown in FIGS. 9 and 10, embodiments of the present invention improve the tail of the aircraft in the prior art to achieve the object of the present invention. The present embodiment includes a tail leading edge skin 5, a leading edge reinforcement 6, a small front beam 7, a wing rib 8, a big front beam 9, and a leading edge cabin skin 10. In some embodiments, the tail leading edge skin 5 and the leading edge cabin skin 10 both adopt the 2024-T3 aluminum alloy material and have the same thickness of 1.62 mm. In some embodiments, the remaining members all adopt the 7075-T6 aluminum alloy material, the thickness of the small front beam 7 is 3.5 mm, the thickness of the wing rib 8 is 2.54 mm, and the thickness of the big front beam 9 is 3.5 mm.

The leading edge reinforcement 6 is located inside the tail leading edge and, in some embodiments, is specifically positioned as follows: spanwisely distributed between 0-100% (or between about 0% to about 100%) of the wing span and chordwisely distributed between 0-30% (or between about 0% to about 30%) of the tail. The leading edge reinforcement 6 is spanwisely fixed in sections between respective spans formed by the wing rib 8 inside the tail leading edge along the tail of the aircraft The leading edge reinforcement 6 may be a plate element. In some embodiments, the leading edge reinforcement 6 is formed by bending of a 2024 aluminum alloy rectangular plate having a thickness of 2.54 mm and has a shape of an isosceles triangle, with the two legs or sides of the isosceles triangle formed by the rectangular plate. The two sides of the leading edge reinforcement 6 are both provided with folded edges, which are located on the same surface of the rectangular plate and are both bent toward the inner side of the leading edge reinforcement 6 (e.g., inwardly from the legs or sides of the triangle and/or along a plane adjacent to or defined by the "base" of the triangle) to thereby form the leading edge reinforcement fixed surface 11. The degrees of the apex angle of the isosceles triangle forming the leading edge reinforcement 6 are the same or substantially the same as the degrees of the apex angle of the tail leading edge skin 5. In the illustrated embodiment, the apex angle of the leading edge reinforcement 6 is 50 degrees, and this apex angle is an arc transition, with the radius of the arc being 5 mm. The two edges of the leading edge reinforcement 6 have a length of 256 mm.

The apex angle of the leading edge reinforcement 6 and the inner surface of the tail leading edge top skin 5 are located in a state of a natural contact, and the two leading edge reinforcement fixed surfaces 11 are connected with the small front beam 7 by rivets. In some embodiments, the rivets adopt high-strength rivets having a diameter of 4 mm, and the rivets are arranged at an interval of 20 mm.

When assembling, the leading edge skin 5 and the small front beam 7 are firstly fixed using double rows of rivets, the connections of the leading edge cabin skin 10 with the small front beam 7, the big front beam 9 and the wing rib 8 all adopt double rows of rivets, and the connections of the wing rib 8 with the small front beam 7 and the big front beam 9 adopt a single row of rivets. The apex angle of the leading edge reinforcement 6 and the tail leading edge skin 5 are made to be located in a state of a natural contact, and the two leading edge reinforcement fixed surfaces 11 are connected with the small front beam 7 by rivets.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed:

1. An aircraft tail capable of improving anti-bird strike performance of aircraft, the aircraft tail comprising:
   a tail leading edge skin, a small front beam fixed to the tail leading edge skin, a wing rib connected to the small front beam, a big front beam connected to the wing rib and a leading edge cabin skin connected to the small front beam, the wing rib and the big front beam, wherein,
   the tail further comprises a leading edge reinforcement, which is located inside a tail leading edge defined by the tail leading edge skin, and which is spanwisely distributed between 0-100% of a wing span of the tail and chordwisely distributed between 0-30% of the tail, the leading edge reinforcement spanwisely fixed in sections between respective spans formed by the wing rib inside the tail leading edge along the tail of the aircraft;

wherein the leading edge reinforcement has a shape of an isosceles triangle having first and second legs of equal length, wherein the degrees of an apex angle of the leading edge reinforcement are the same as the degrees of an apex angle of the tail leading edge skin, and wherein the apex angle of the tail leading edge is a transition arc having a radius of 5 mm;

wherein the leading edge reinforcement is fixedly connected with the small front beam through a leading edge reinforcement fixed surface;

wherein the big front beam is located at a rear portion of the aircraft tail.

2. The aircraft tail according to claim 1, wherein, the leading edge reinforcement includes first and second coplanar and spaced-apart folded edges, the first folded edge extending inwardly from the first leg of the leading edge reinforcement, the second folded edge extending inwardly from the second leg of the leading edge reinforcement, wherein the first and second folded edges form the leading edge reinforcement fixed surface.

3. An aircraft tail capable of improving anti-bird strike performance of aircraft, the aircraft tail comprising:
a tail leading edge skin;
a small front beam fixed to the tail leading edge skin;
a wing rib connected to the small front beam;
a big front beam connected to the wing rib;
a leading edge cabin skin connected to the small front beam, the wing rib and the big front beam; and
a leading edge reinforcement located inside a tail leading edge defined by the tail leading edge skin and spanwisely distributed about at least a major portion of a wing span of the tail and chordwisely distributed between at least a portion of the tail;

wherein the leading edge reinforcement is spanwisely fixed in sections between respective spans defined by the wing rib inside the tail leading edge along the tail of the aircraft;

wherein the leading edge reinforcement has a cross-sectional shape of a triangle having first and second legs, wherein an apex angle of the leading edge reinforcement is substantially the same as an apex angle of the tail leading edge skin, and wherein the apex angle of the tail leading edge is a transition arc; and wherein the leading edge reinforcement is fixedly connected with the small front beam through a leading edge reinforcement fixed surface, wherein the leading edge reinforcement surface includes first and second coplanar and spaced-apart base edges, wherein the first base edge extends from the first leg toward the second leg of the leading edge reinforcement and the second base edge extends from the second leg toward the first leg of the leading edge reinforcement.

4. The aircraft tail of claim 3, wherein the big front beam is located at a rear portion of the aircraft tail.

5. The aircraft tail of claim 3, wherein the leading edge reinforcement is configured to segment a bird and disperse energy to opposite sides of the leading edge reinforcement when the bird strikes the aircraft tail.

* * * * *